(12) United States Patent
Lam et al.

(10) Patent No.: US 11,774,318 B2
(45) Date of Patent: Oct. 3, 2023

(54) FORCE AND INCLINATION MONITORING SYSTEM WITH SELF-POSITION RECOGNITION

(71) Applicants: Ronald Chun Yu Lam, Hong Kong (CN); Louis Chi Hung Lam, Hong Kong (CN)

(72) Inventors: Ronald Chun Yu Lam, Hong Kong (CN); Louis Chi Hung Lam, Hong Kong (CN)

(*) Notice: Subject to any disclaimer, the term of this patent is extended or adjusted under 35 U.S.C. 154(b) by 405 days.

(21) Appl. No.: 17/251,273

(22) PCT Filed: Jun. 3, 2020

(86) PCT No.: PCT/CA2020/050757
§ 371 (c)(1),
(2) Date: Dec. 11, 2020

(87) PCT Pub. No.: WO2021/003556
PCT Pub. Date: Jan. 14, 2021

(65) Prior Publication Data
US 2022/0187156 A1 Jun. 16, 2022

Related U.S. Application Data

(60) Provisional application No. 62/870,826, filed on Jul. 5, 2019.

(51) Int. Cl.
*G01L 1/00* (2006.01)
*G01M 5/00* (2006.01)
(Continued)

(52) U.S. Cl.
CPC ........... *G01M 5/0058* (2013.01); *E04G 11/56* (2013.01); *E04G 25/061* (2013.01);
(Continued)

(58) Field of Classification Search
CPC .... G01M 5/0058; E04G 11/56; E04G 25/061; E04G 25/065; G01C 9/06; G01L 1/22
See application file for complete search history.

(56) References Cited

U.S. PATENT DOCUMENTS

| 10,225,629 B2* | 3/2019 | Lam ..................... G01M 5/0041 |
| 2004/0037676 A1 | 2/2004 | Harris et al. |

(Continued)

FOREIGN PATENT DOCUMENTS

| AU | 2012205171 A1 | 8/2012 |
| CN | 1619105 A | 5/2005 |

(Continued)

OTHER PUBLICATIONS

Annamdas et al. (2012) "Practical implementation of piezo-impedance sensors in monitoring of excavation support structures," Structural Control Health Monitoring 19(2): 231-245.

(Continued)

*Primary Examiner* — Max H Noori
(74) *Attorney, Agent, or Firm* — Timothy W. Menasco, Esq.; Harter Secrest & Emery LLP

(57) ABSTRACT

The present invention relates to a sensor device, system, and monitoring system for monitoring force and inclination of load supporting members, such as temporary support props. The sensor devices include a tubular member that interface with and slidably/detachably attached to the temporary support props, and sensors on the tubular member for measuring force, inclination and position of the temporary support props for construction and demolition work. The sensor device includes a controller for processing data from the sensors. The sensor system includes a wireless device that communicates with the sensor device. The sensor system further comprises positioning device, such that precise location or position of the sensor devices may be detected/calculated by the sensor system. The monitoring system (Continued)

includes a server that communicates one or more sensor systems to form a network.

11 Claims, 14 Drawing Sheets

(51) Int. Cl.
    *E04G 11/56*     (2006.01)
    *E04G 25/06*     (2006.01)
    *G01C 9/06*     (2006.01)
    *G01L 1/22*     (2006.01)

(52) U.S. Cl.
    CPC ............. *E04G 25/065* (2013.01); *G01C 9/06* (2013.01); *G01L 1/22* (2013.01)

(56) References Cited

U.S. PATENT DOCUMENTS

| | | |
|---|---|---|
| 2005/0073189 A1 | 4/2005 | O'Quinn et al. |
| 2011/0097180 A1 | 4/2011 | Bastone |
| 2013/0322800 A1* | 12/2013 | Abgrall ................ F16C 41/007 73/866.5 |
| 2014/0278150 A1 | 9/2014 | Baesler et al. |
| 2015/0144762 A1 | 5/2015 | Lam et al. |
| 2016/0231448 A1* | 8/2016 | Andel .................. F41H 11/136 |
| 2016/0340856 A1 | 11/2016 | Conner et al. |
| 2022/0237395 A1* | 7/2022 | Nielsen .................. G01H 1/00 |

FOREIGN PATENT DOCUMENTS

| | | |
|---|---|---|
| CN | 102277882 A | 12/2011 |
| CN | 102713107 A | 10/2012 |
| CN | 102822649 A | 12/2012 |
| CN | 105019486 A | 11/2015 |
| CN | 105756687 A | 7/2016 |
| CN | 105899742 A | 8/2016 |
| CN | 106368426 A | 2/2017 |
| CN | 207163500 U | 3/2018 |
| CN | 108239994 A | 7/2018 |
| CN | 108489440 A | 9/2018 |
| CN | 208168428 U | 11/2018 |
| CN | 208267406 U | 12/2018 |
| CN | 109141709 A | 1/2019 |
| CN | 208313351 U | 1/2019 |
| CN | 109899075 A | 6/2019 |
| KR | 20110021626 A | 3/2011 |
| WO | 2006012550 A2 | 2/2006 |
| WO | 2015070312 A1 | 5/2015 |
| WO | 2018208162 A1 | 11/2018 |

OTHER PUBLICATIONS

Bing et al. (2015) "Support-unloading Simulation and Stress Monitoring of Huarun Vanguard Shopping Mall," Construction Technology 44: 530-534.

Wang et al. (2013) "Design of supporting struture moniroting system based on ZigBee and GPRS," Modern Electronics Tehnique 36(24): 90-98.

* cited by examiner

FORCE AND INCLINATION MONITORING SYSTEM WITH SELF-POSITION RECOGNITION

CROSS-REFERENCE TO RELATED APPLICATIONS

The present application claims the benefit of and priority to U.S. Provisional Application No. 62/870,826 filed on Jul. 5, 2019, the contents of which are incorporated herein by reference.

STATEMENT REGARDING FEDERALLY SPONSORED RESEARCH OR DEVELOPMENT

N/A

NAMES OF THE PARTIES TO A JOINT RESEARCH AGREEMENT

N/A

REFERENCE TO A "SEQUENCE LISTING"

N/A

BACKGROUND OF THE INVENTION

Field of the Invention

The present invention generally relates to a sensor device with sensors for measuring force, inclination and position. The sensor devices are detachably installed to load supporting members, such as temporary support props, of a falsework structural system used for construction and demolition work, primarily for improvement of construction safety and secondarily for quality enhancement of new work. The present invention further relates to a sensor system including a wireless device that communicates with one or more of the sensor devices. The present invention yet further relates to a monitoring system that includes a server that communicates with one or more of the sensor systems for collecting data and relevant information therefrom. It yet further relates to the monitoring system having the ability to provide loading, inclination and location data and present the information to relevant parties in formats that are easy to understand.

Description of Related Art

Use of temporary supports and temporary support systems are indispensable during demolition, construction or erection of buildings and engineering structures. During construction stage, for example, temporary support systems built up from scaffolding frames are widely used to provide a support structure for newly poured concrete to form floors, decks, etc. Before a freshly poured concrete floor or deck has gain sufficient strength to support its own weight and any imposed loading, the weight of the formwork and concrete are transferred to either the floor below or to the ground by a scaffolding system. Temporary supports systems are also used to support structural components which have not yet been fully connected or secured.

On the other hand, for demolition works that are adopting the mechanical top down approach, for example, temporary props are installed at the inter-floor spaces in between several consecutive floors to distribute, among the propped floors, the gravity load of heavy demolition machinery operating on the top floor. Owing to the complexity of site and environmental conditions, the exact/actual loading carried by each individual member or prop in a temporary load supporting system is usually unknown. The actual distribution of the load depends also largely on the initial load that is applied to each prop during installation and initial set up; however, the initial load has never been checked or monitored owing to the lack of suitable instrument or equipment.

Not until recently, there was not any site viable device or system which is cost effective enough to facilitate regular monitoring of the load in each prop or member of a temporary support system. In most cases, the design of a propping system is based on either rule of thumb or general past experience. This uncertainty, when combined with other adverse factors, has led to numerous severe and disastrous failure cases. Based on common existing technology, if the load in a prop has to be measured, a load cell is needed to be placed at one of the ends of the prop. The electrical signal from the load cell has to be connected to a process meter to display the magnitude of the load in force units. The load cell and the process meter have to be calibrated together as a combined set before used to take measurements. Once calibrated, the combination cannot be changed among different load cells and process meters. Power cable and signal transmission cable have to be installed between the process meter and the monitoring station. Thus, the cost of measurement and/or monitoring is very high. The use of cables for signal transmission creates a lot of inconvenience at the construction site and may even become safety hazards. These short comings of the technique prevent it to be applied efficiently for massive data gathering and monitoring.

Various attempts are made previously. For example, U.S. Pat. No. 8,215,178 to Saigh (or Saigh), contents of which is incorporated herein by reference, relates to sensor device to monitor deformation in structural members, such as solid structures; however, strain gauges are attached directly to the surface of the structure to be monitored.

U.S. Pat. No. 8,384,398 to Laflamme et al. (or Laflamme et al.), contents of which is incorporated herein by reference, discloses a structural health monitoring system that uses one or more capacitive sensor assemblies that employ a soft dielectric material for monitoring cracks or formation of cracks on a structural element.

U.S. Pat. No. 10,225,629 to Lam et al., (or Lam et al.), contents of which is incorporated herein by reference, discloses a monitoring system for force and inclination for each prop in a temporary support propping system can be measured using a wirelessly method.

U.S. Pat. No. 6,292,108 to Straser et al. (or Straser et al.) discloses a structural monitoring system; however, Straser et al. does not provide any solution for automatically discovering the location or position of each sensor unit.

Accordingly, these prior art references present, at least, for example, three major shortcomings.

Firstly, measurements of force and inclination described in the teaching relied on force and inclination sensors irremovably attached onto the body of a support member (prop). If the prop is damaged by mishandling at a construction site, the user will also lose the expensive sensors.

Secondly, while the proposed temporary support system comprising of props is popularly used in demolition work, such type of system is not a common practice in new construction work.

Thirdly, for effective monitoring, a large number of sensors are required. To correctly identify this large number of sensors and their corresponding locations is a tedious job which is highly vulnerable to errors or mistakes.

Thus, there is a need to develop an enhanced device and system that can be easily installed and dismantled from load supporting structural members for use both in new construction and demolition work, while at the same time, the device can automatically identify itself and report the coordinates of its position. A solution is provided by this patent application.

BRIEF SUMMARY OF THE INVENTION

An object of the present patent application is to provide a monitoring system, which is capable to measure the force and inclination of a single telescopic support prop, or of a load bearing member of a scaffolding frame which is resting on a base screw jack.

Another object of the present patent application is to provide a detachable coaxial sensor device for signal detection and communication, to work in combination with one or a plurality of force (strain) sensor that is attached to the load transfer core of the detachable coaxial sensor device, to receive loading information and wirelessly transmit and receive loading information and command signals to and from a wireless communication device.

Yet another object of the present patent application is to provide a detachable coaxial sensor device for signal detection and communication, to work in combination with one or a plurality of inclination sensor that is attached to the body of the detachable coaxial sensor device, to receive inclination angle information and wirelessly transmit and receive inclination angle information and command signals to and from a wireless communication device.

Yet another object of the present patent application is to provide a detachable coaxial sensor device for signal detection and communication, to work in combination with a position recognition sensor that is attached inside the detachable coaxial sensor device, to receive position information and wirelessly transmit and receive position information and command signals to and from a wireless communication device.

Yet another object of the present patent application is to provide a wireless communication device to establish a communication network with one or a plurality of detachable coaxial sensor device for transmission and reception of load, inclination and position data/information and to transmit and receive data/information and command signals to and from a central monitoring/control station.

Yet another object of the present patent application is to provide a group of wireless communication devices with coordinate sensor unit for accurate position coordinates determination by satellite navigation technology, to establish a communication network with one or a plurality of detachable coaxial sensor device to enable the position recognition sensor in the detachable coaxial sensor device to determine its own position coordinates.

Yet another object of the present patent application is to provide a group of wireless communication devices with coordinate sensor unit for accurate position coordinates determination by satellite navigation technology, to establish a global communication network to transmit and receive data/information and command signals to and from a central monitoring/control station.

Yet another object of the present patent application is to provide a comprehensive monitoring system to provide real time information on the loading conditions and inclination of the supporting props or load bearing members of scaffolding frames, during demolition and construction periods, in such a way that warning and alarm signals can be issued to alert construction workers of the potential danger of structural failure when the load bearing capacity of the supporting prop or member has exceeded.

Yet another object of the present patent application is to provide a comprehensive monitoring system assuring that each prop or load bearing member can be adjusted to the appropriate designed initial load to achieve the desirable load distribution during demolition.

Yet another object of the present patent application is to provide a comprehensive monitoring system assuring that the props or load bearing members of scaffolding frames are adjusted to within the required verticality tolerance in the demolition or new construction temporary support systems.

Yet another object of the present patent application is to provide a comprehensive monitoring system assuring that: the pouring rate of concrete can be controlled at the designed rate so as not to cause overloading on the temporary supporting system; proper propping and re-propping at construction stage to prevent premature loading on concrete flooring while the concrete is still gaining strength and thus avoiding impairment to the final strength of the structural floor.

Yet another object of the present patent application is to provide a comprehensive monitoring system, during a demolition process, to assure that the weight of the machinery and the cumulated debris will not cause overloading on the temporary supporting system.

Yet another object of the present patent application is to provide a comprehensive monitoring system where the position of each detachable coaxial sensor device can be automatically recognized with information of the position coordinates of each device collected and transmitted to a central monitoring station for processing.

Yet another object of the present patent application is to provide a comprehensive monitoring system where the loading, inclination and position data from each detachable coaxial sensor device can be automatically incorporated into a digital representation such as Building Information Modeling (BIM).

According to one embodiment of the present patent application, it provides a system with the two essential types of devices. The first type is an added-on detachable coaxial sensor device with load, inclination direction/angle and position measuring capabilities. The detachable coaxial sensor device is inserted coaxially in between a load supporting member of a scaffolding frame and the screw jack base of the member to provide load and inclination direction/angle information. The detachable coaxial sensor device also has a position recognition sensor for determination of the coordinates at which the detachable coaxial sensor device is located.

The second type of device is a wireless communication device with a coordinate sensor unit. A group of three or more wireless communication devices with coordinate sensor unit are installed at locations where signals from satellites of GNSS are receivable. The wireless communication devices should also be placed at close proximity to the detachable coaxial sensor devices measuring force and inclination of the load supporting members. The micro controller and communication unit installed inside each detachable coaxial sensor device communicates with a group of three (or a larger number) of wireless communication devices with coordinate sensor unit to determine accurately the position coordinates of the detachable coaxial sensor device, and also transmit and receive data information and command signal to and from a selected wireless communication device with coordinate sensor unit.

The wireless communication devices with coordinate sensor unit are connected in a network and information on the load supporting member of the scaffolding frame is relayed to a central monitoring/control station. The central monitoring/control station can then inform the users of the monitoring system about the current status of the temporary support system with regards to the force and inclination direction/angle of each support member, and issue warning signals if required. The central monitoring/control station can also issue signals or commands to the micro controller and communication unit to increase the rate of data capturing and reporting, should conditions on the temporary support system exceed preset ranges.

Based on the information on the magnitude of the force, or magnitudes of forces, the users can carry out field adjustment of the force in each load supporting member. Should the monitoring system detect overloading or initial signs of structural instability, alarm signals from the central monitoring/control station can provide life saving time for workers to evacuate. Alternatively, the central monitoring/control station can issue command to a warning system at the affected area to call for evacuation.

The present invention may be best understood and will become apparent from the following description with referencing to the accompanying drawings.

DETAILED DESCRIPTION OF THE INVENTION

Figure 1:
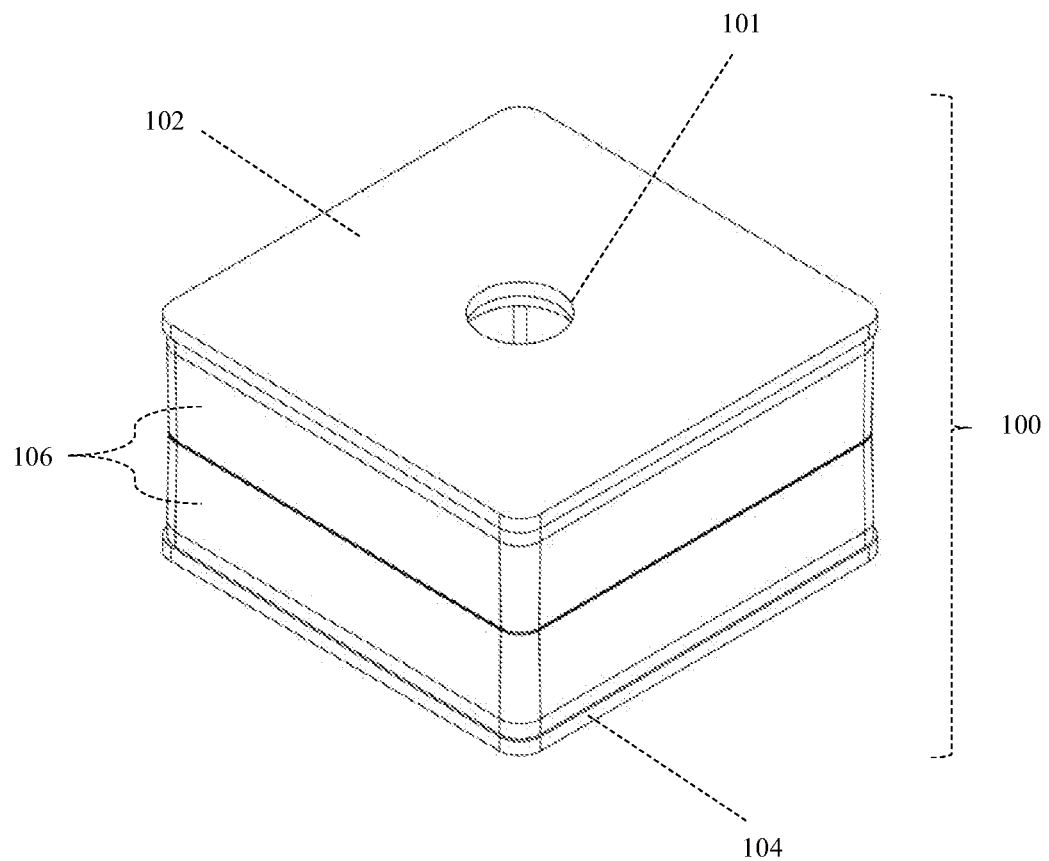
FIG. 1 shows a top perspective view of a detachable coaxial sensor device 100 in accordance with the present invention, comprising of an upper plate 102, a lower plate 104 and a housing enclosure 106.
Figure 2:
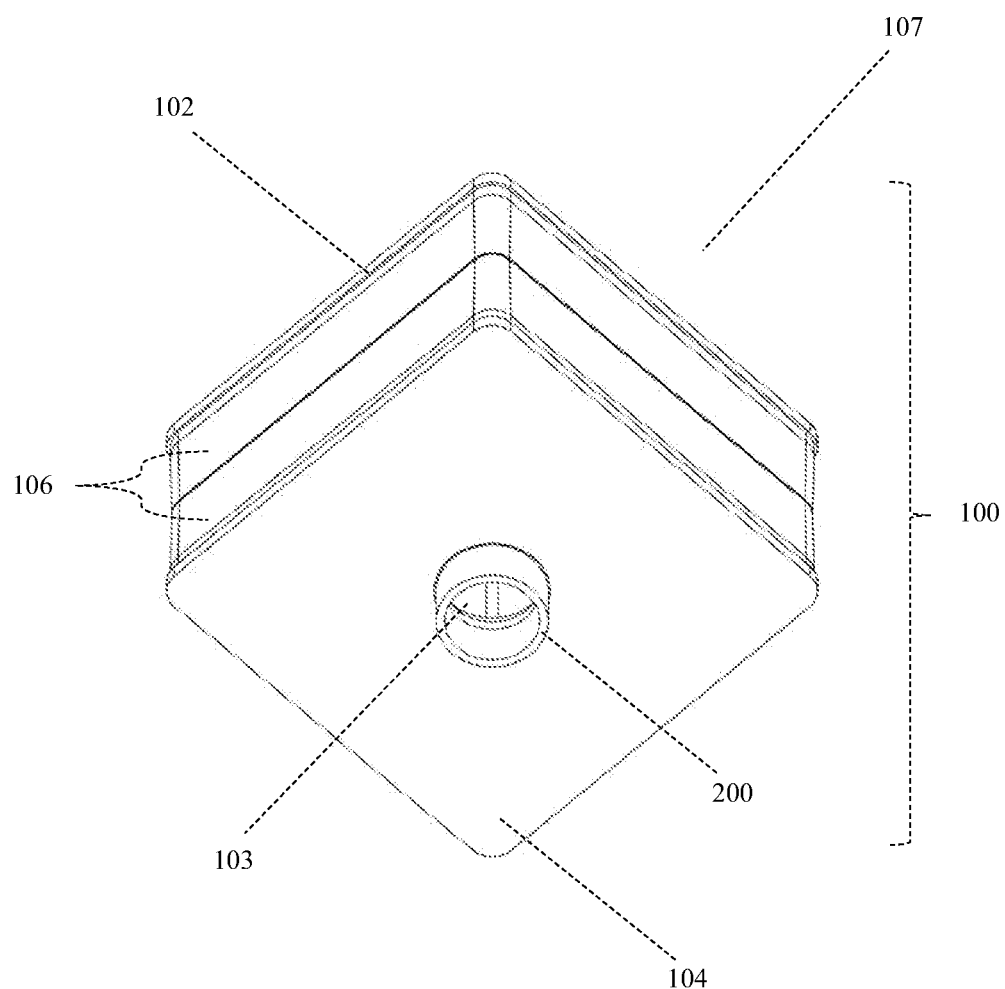
FIG. 2 shows a bottom perspective view of the detachable coaxial sensor device 100 with a spacer ring 200 attached.

FIG. 1 shows a top perspective view; and, FIG. 2 shows a bottom perspective view of a detachable coaxial sensor device 100 for a temporary support device, such as a temporary support prop, temporary support frame system and temporary support scaffold in accordance with the present invention. The detachable coaxial sensor device 100 comprises an upper plate 102, a lower plate 104 and a housing enclosure 106 to form a housing 107. It is to be understood that, while the upper plate 102 and lower plate 104 are shown as in a substantially square shape, the shape of the upper plate 102 and lower plate 104 can be other than square. For example, it may be in rectangular, or any other polygonal shapes, or circular or other oval shapes. There is an opening 101 on the upper plate 102, and another opening 103 on the lower plate 104 for allowing the threaded segment 502 of the lower section of a temporary support prop 500, or the screw stem of a jack screw base 604 of a temporary support frame system 600 to pass through. Optionally, a spacer ring 200 may be attached to the opening 103 on the lower plate 104. The spacer ring 200 may be provided for a space for the handle of the screw jack and the bottom plate of the sensor unit 104.

Figure 3:
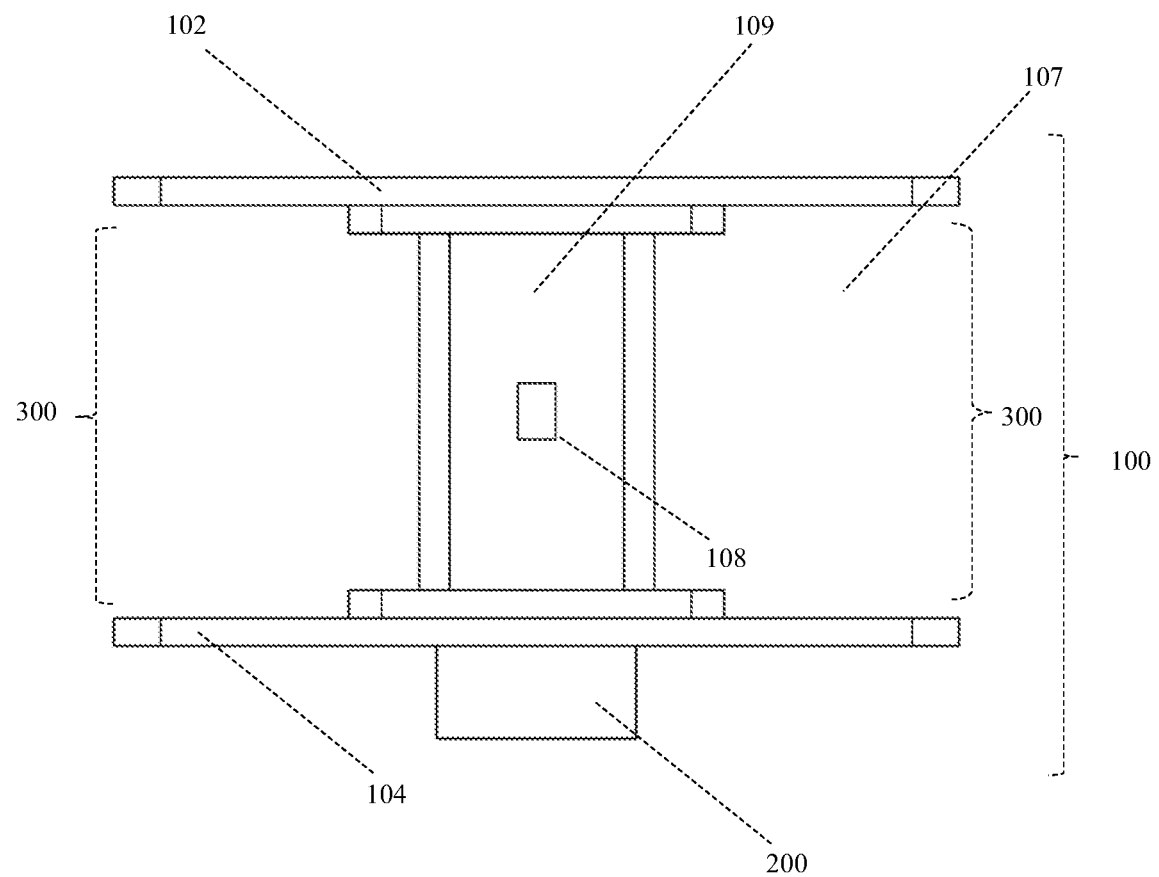
FIG. 3 shows a side view of the internal cavity 300 of the detachable coaxial sensor device 100 when the housing enclosure 106 is removed and exposing the sensor placement mounting 108.

FIG. 3 shows a side view of the internal cavity 300 of the housing 107 of the detachable coaxial sensor device 100 when the housing enclosure 106 is removed and exposing a sensor placement mounting 108 on the tubular core 109 of the sensor device 100 being placed between the opening 101 on the upper plate 102 and the opening 103 of the lower plate 104. The sensor placement mounting 108 comprises a sensor suite, including strain/force sensors 132, one or more vibration sensors 134, one or more inclination sensor 136, one or more humidity sensor 142, one or more barometric sensors 140, and one or more temperature sensor 138.

Figure 4:
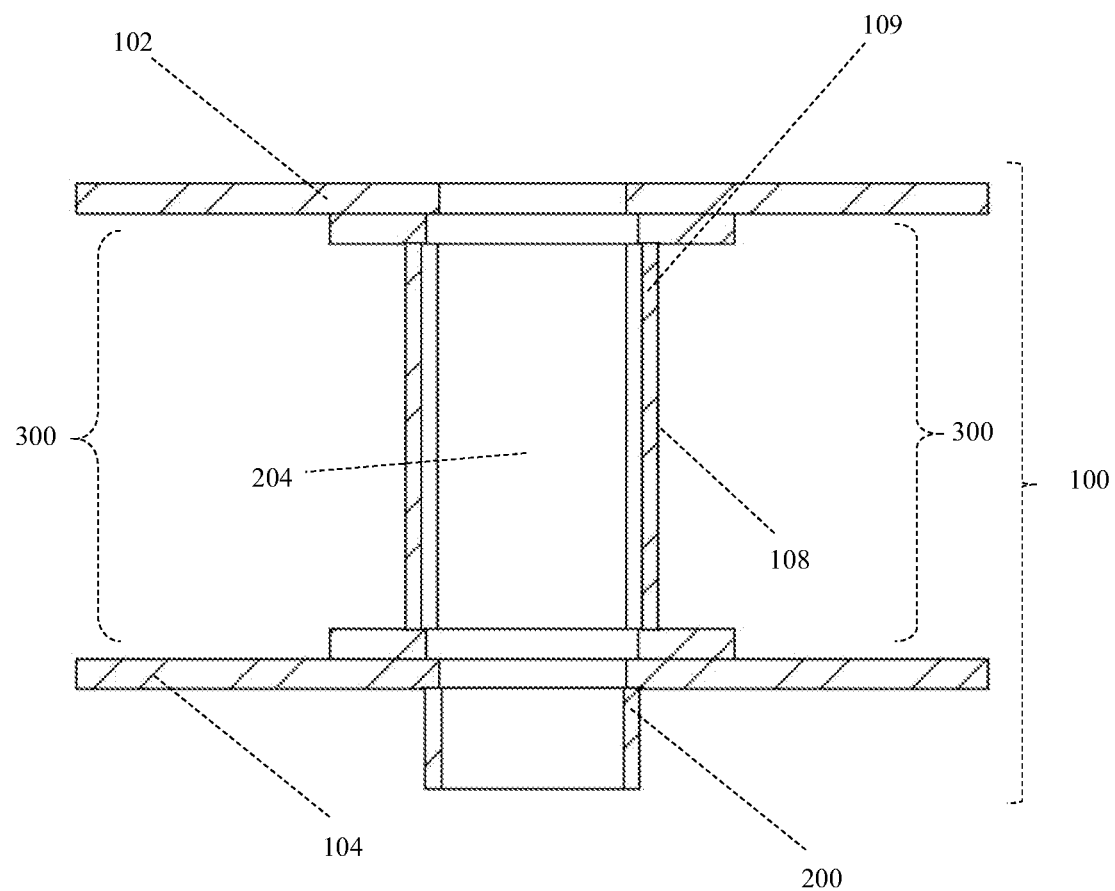
FIG. 4 shows a cross section view of the detachable coaxial sensor 100.

FIG. 4 shows a cross section view of the detachable coaxial sensor 100. Opening 204 in the spacer ring 200 is sized and arranged such that the frame passes therethrough. The tubular core 109 of the sensor device 100 receives the load acting on the top of the upper plate 102 and on the bottom surface of the bottom plate 104.

Telescopically extendible and tractable temporary support devices, such as temporary support props including, but not limited to acrow props, temporary support frame system, and temporary support scaffolds (such as Toyo® scaffolds) are commonly used in various construction projects, demolition projects, etc. Usually, such support devices have at least two longitudinal tubular members, one of which telescopically engages with the other member, and further has a means to releasably hold/lock the two longitudinal members in position.

Figure 5A:
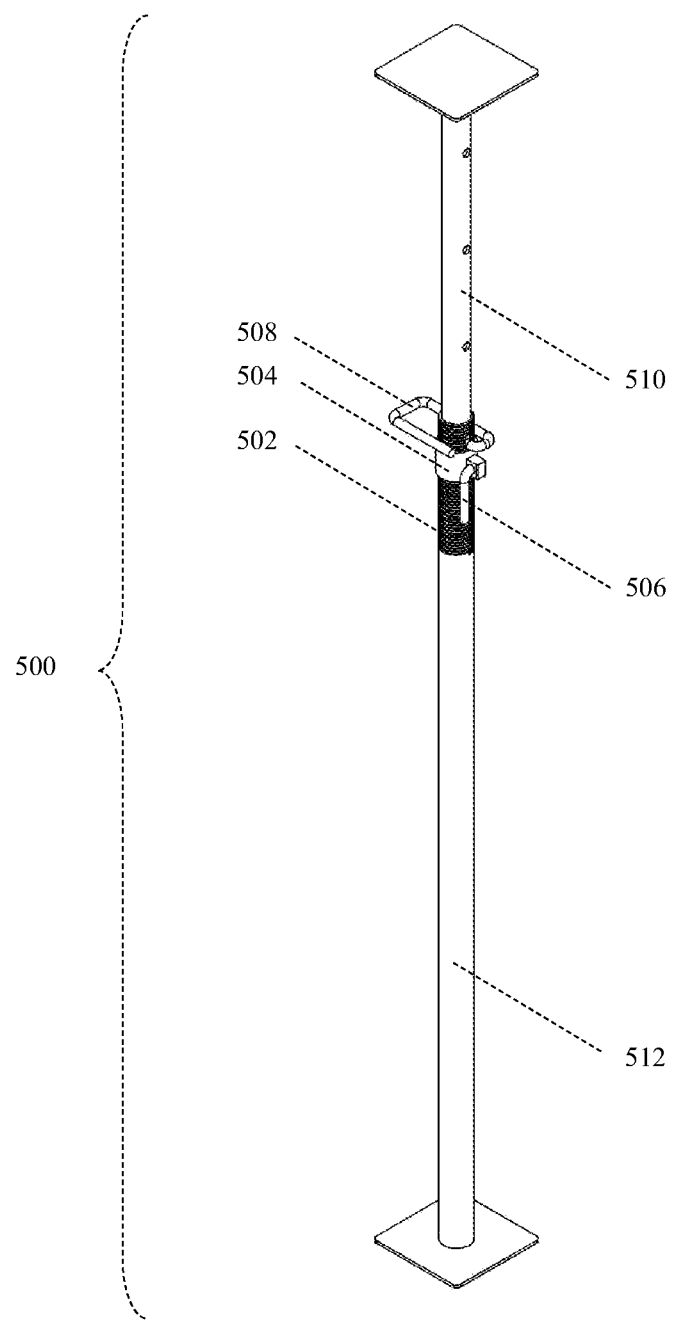
FIG. 5a shows a perspective view of a typical temporary support prop 500 with an upper section 510, a lower section 512, screw threads at the top segment of the lower section 502, Jack crew nut for height adjustment 504, handle of jack screw nut for height adjustment 506 and locking pin 508.

FIG. 5a shows a perspective view of a typical telescopically extendible temporary support prop 500, having an upper section 510, a lower section 512, screw threads 502 at the top segment of the lower section 512, a Jack crew nut 504 for height adjustment, a handle 506 of jack screw nut 504 for height adjustment, and locking pin 508. As a person of ordinary skilled in the pertinent art would understand that the upper section 510 and lower section 512 of the temporary support prop 500 are tubular members. The upper section 510 of the temporary support prop 500 may have smaller diameter than that of the lower section 512, such that the upper section 510 of the temporary prop 500 telescopically and slidably engages with the lower section 512 of the temporary support prop 500, thus the upper section 510 extends from/retracts into the lower section 512. As a person of ordinary skilled in the pertinent art would further appreciate that the upper section 510 may have larger diameter than the lower section 512, such that the lower section 512 extends from/retracts into the upper section 510.

Figure 5B:
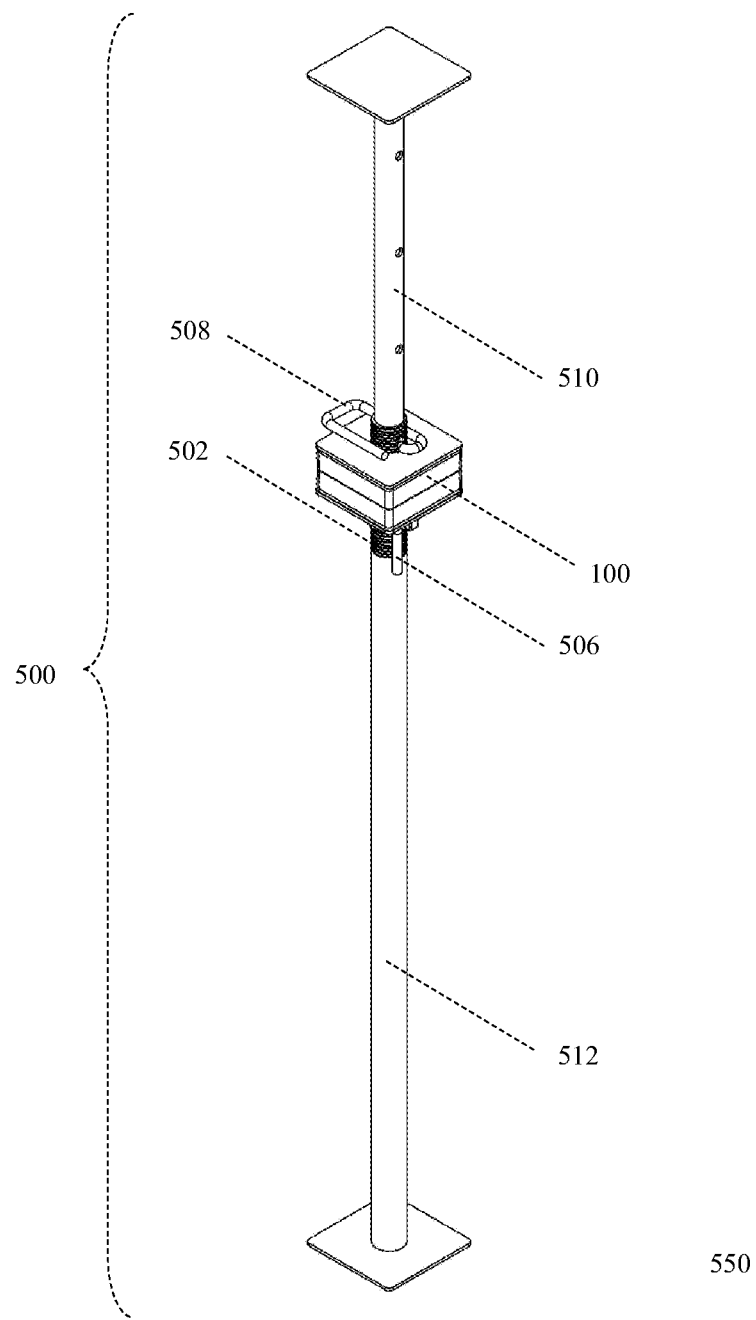
FIG. 5b shows a perspective view of a typical temporary support prop assembly 550 with a detachable coaxial sensor device 100 on a temporary support prop 500, where the detachable coaxial sensor device 100 is inserted into the temporary support prop 500.

FIG. 5b shows a perspective view of a typical temporary support prop assembly 500 with a detachable coaxial sensor device 100, where the detachable coaxial sensor device 100 is inserted into a temporary support prop 500. In a preferred embodiment of the present invention, the detachable coaxial sensor device 100 may be positioned at or about a portion that the upper section 510 and lower section 512 interface each other, such that the detachable coaxial sensor device 100 is placed on the lower section 512 of the temporary support prop 500 at the place where the locking pin 508 of the temporary support prop 500 rests on the upper surface of the upper plate 102; and the lower surface of the lower plate 104 interfaces with the jack screw nut 504 of the temporary support prop 500. The spacer ring 200 may further be provided to keep a space between the handle 506 of the Jack screw nut 504 and the bottom plate 104 to avoid interference to the operation/movement of the handle 506. Accordingly, the load on the temporary support prop 500 is represented on the upper plate 102 and the bottom plate 104 and passing the total load onto the tubular core 109, such that it enables the sensor device 100 to measure the total load thereof. It is to be understood that these upper and bottom plates 102 and 104 may be optional, as long as the tubular core 109 is configured, structured and/or arranged to receive and represent the total load on the temporary support prop 500, or there are means for receiving and represent the total load of the temporary support prop 500 on the tubular core 109.

Figure 6A:
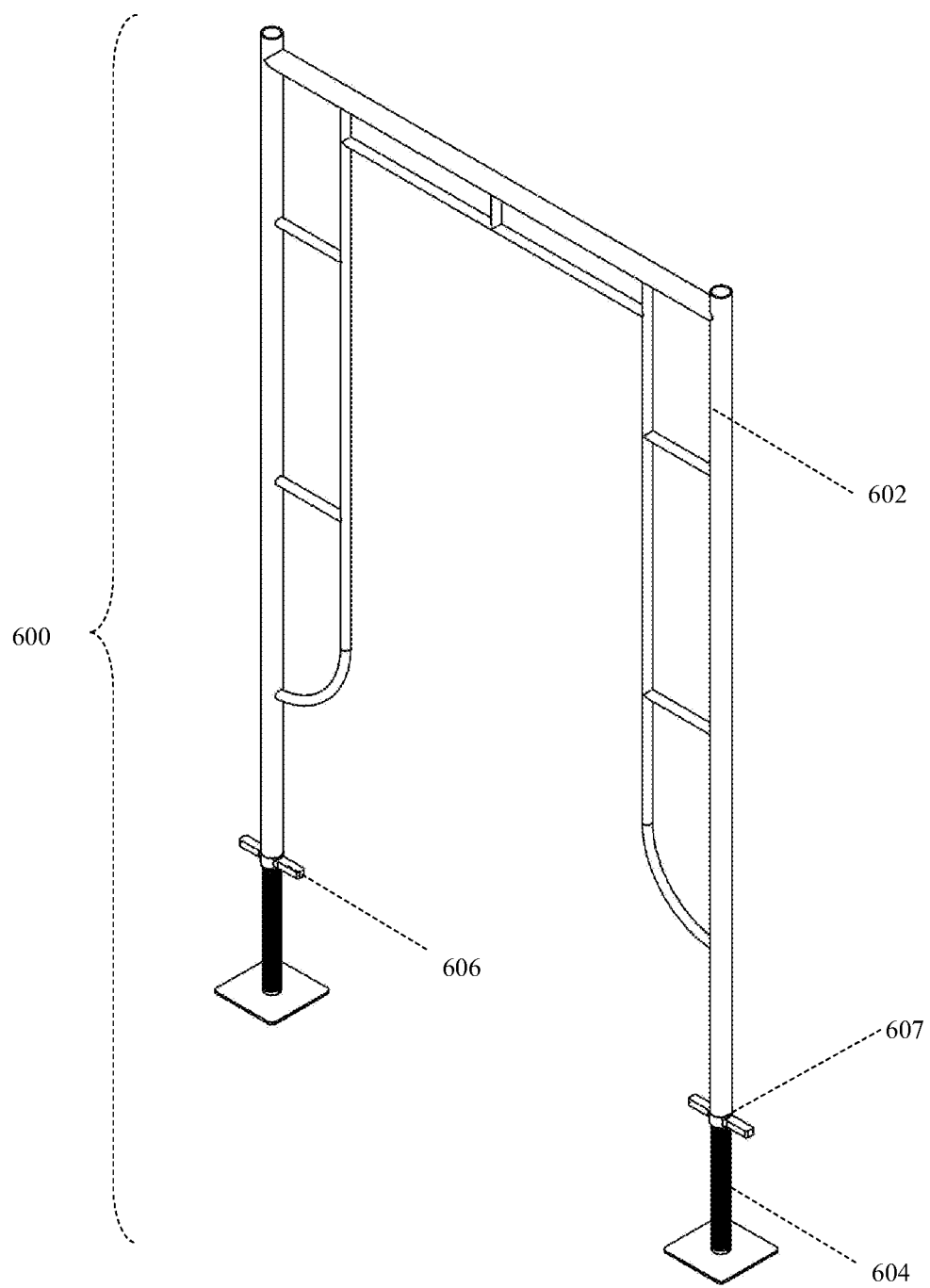
FIG. 6a shows a perspective view of a typical temporary support frame system 600 comprising of a temporary support frame 602, jack screw nuts 606 and jack screw bases 604.

FIG. 6a shows another typical telescopically extendible/retractable temporary support frame system 600 consisting of load carrying members 602, a lower end 607 thereof resting on jack screw nuts 606 of two jack screw bases 604. The load carrying members 602 are arranged to slidably and/or operably receive the jack screw bases 604, which extends from and retracts into the support frame 602.

Figure 6B:
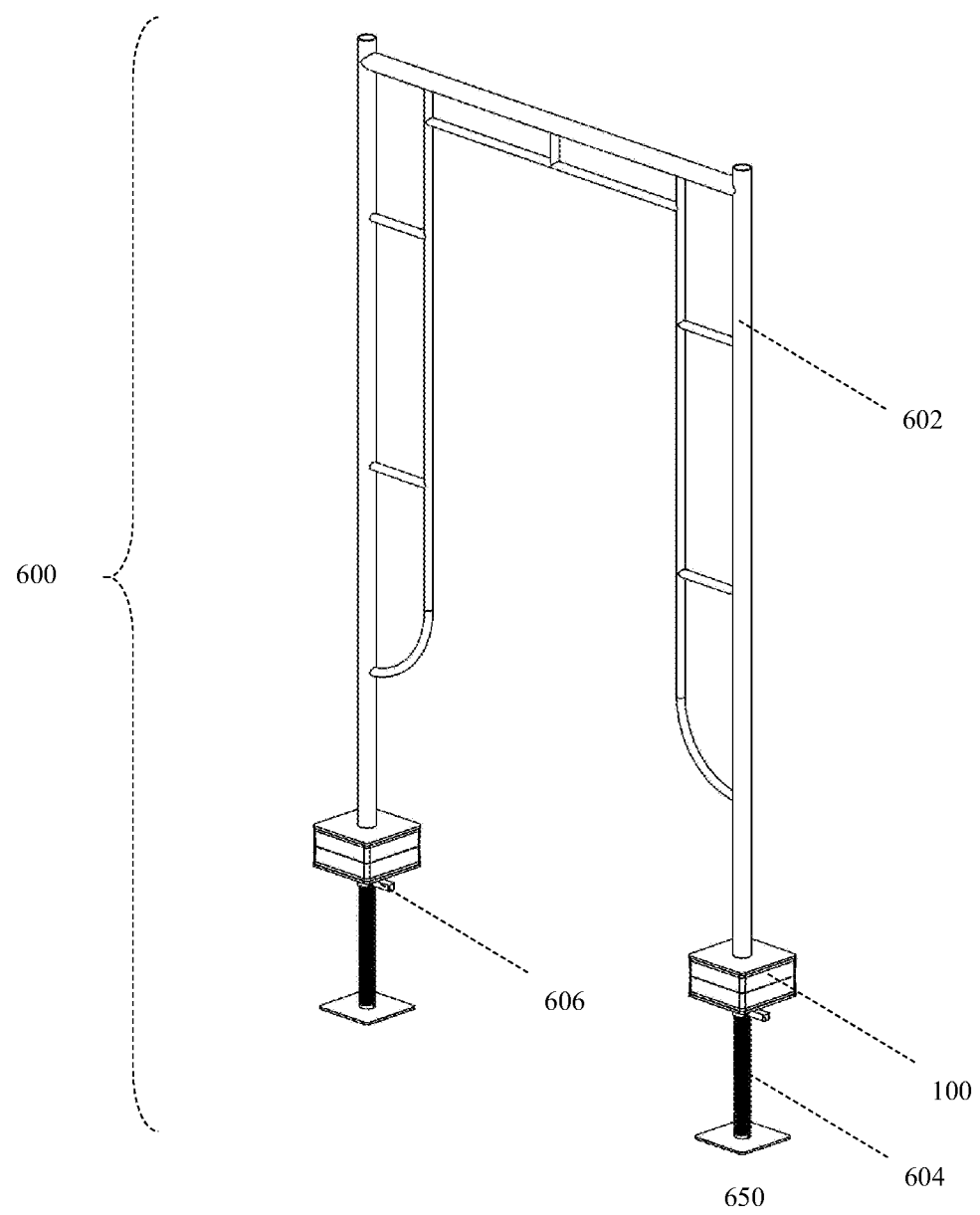
FIG. 6b shows a perspective view of a typical temporary support frame system assembly 650 with detachable coaxial sensor devices 100 on a temporary support frame system 600, which are inserted into/attached thereto the temporary support frame system 600.

FIG. 6b shows a typical temporary support frame system assembly 650 with a detachable coaxial sensor device 100 on a temporary support frame system 600 inserted coaxially between the lower end 607 of each load carrying member (or vertical member) 602 of the temporary support frame 600 and the jack screw nut 606 of the jack screw base 604. The top surface of the upper plate 102 interfaces with the lower portion 607 of the load carrying member 602, and the bottom plate 104 interface with the jack screw nuts 606 such that a total load on the temporary support frame 600 is represented on the tubular core(s) 109 in order for the sensor device(s) 100 to sense the load on the temporary support frame system 600. It is to be understood that these upper and bottom plates 102 and 104 may be optional, as long as the tubular core 109 is configured, structured and/or arranged to receive and represent the total load on the temporary support frame 600, or there are means for receiving and represent the total load of the temporary support frame 600 on the tubular core 109.

Figure 7:
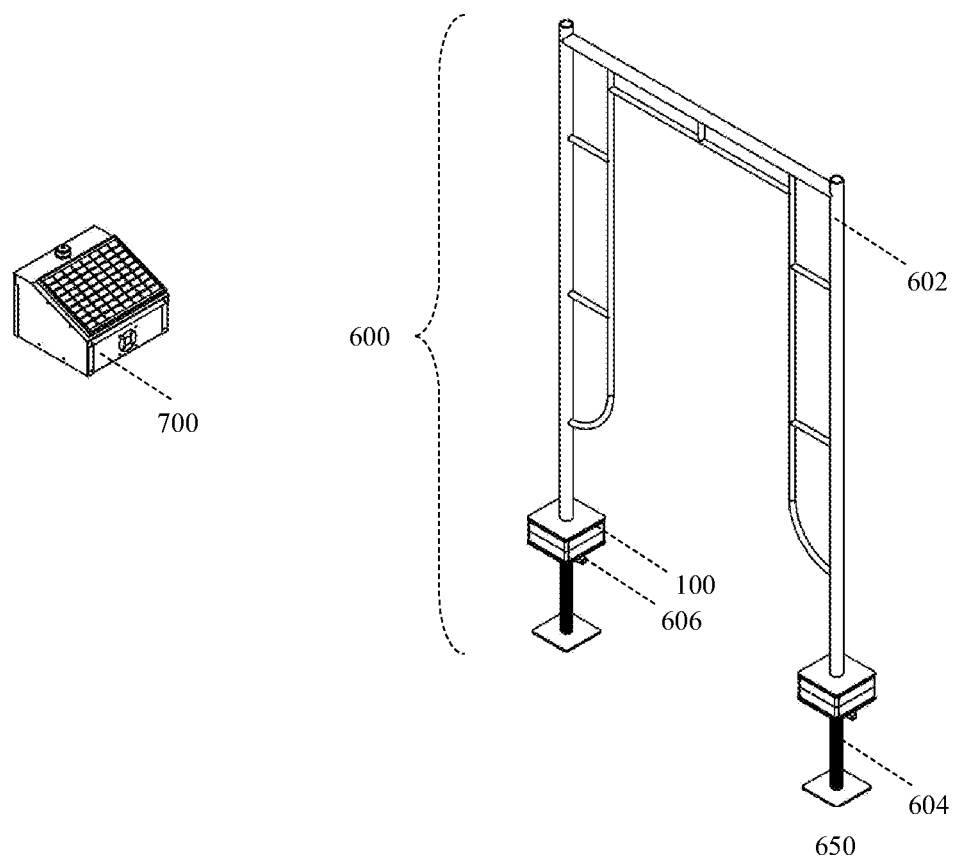
FIG. 7 shows a typical temporary support frame system assembly 650 with inserted detachable coaxial sensor devices 100 and a wireless communication device 700.

FIG. 7 shows a temporary support monitoring system consists of a temporary support frame system 650 with inserted detachable coaxial sensor devices 100 and a wireless communication device 700 for wireless communication with the detachable coaxial sensor devices 100. The detachable coaxial sensor devices may be placed on any place along the vertical members 602 and the jack screw bases 604. The load carried by the temporary support frame 600 is transferred at the lower end of each vertical member 602 to the jack screw nut 606 of the jack screw base 604. Accordingly, according to a preferred embodiment of the present invention, the detachable coaxial sensor devices 100 are placed such that the load carried by the temporary support frame 600 is transferred through each vertical member 602 via the coaxial sensor devices 100 to the jack screw base 604. Further preferred embodiment of the present invention, the detachable coaxial sensor device 100 is placed at the lower end of the vertical member 602. This allows the detachable coaxial sensor device 100 to capture the loading information on the temporary support frame 600. According to yet further preferred embodiment of the present invention, the spacer ring 200 may further be provided extending downwardly from the lower plate 104 for providing a clearance/space required for or prevent any interference with operating/movement of the jack screw nut 606.

Figure 9:
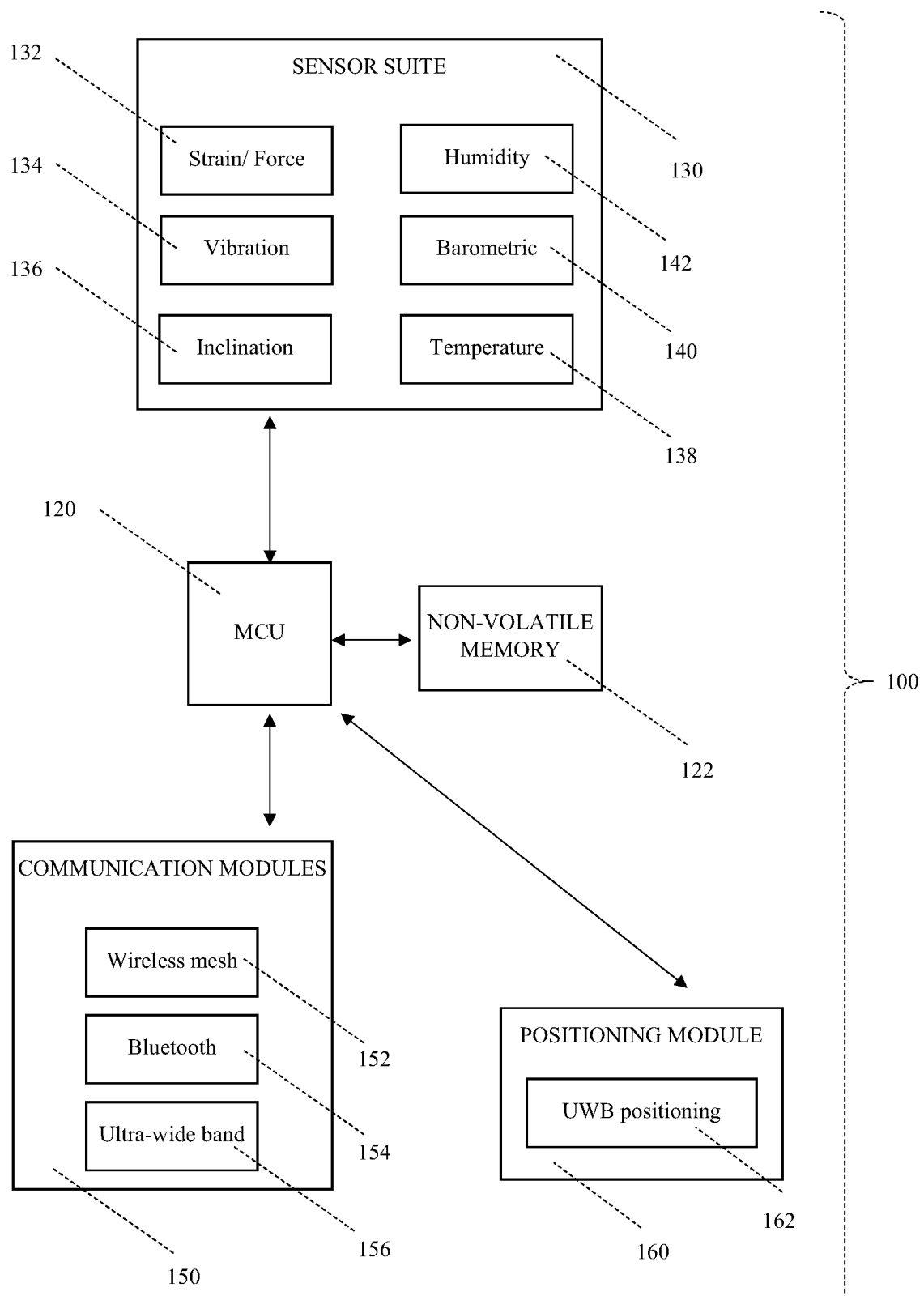
FIG. 9 shows a functional block diagram 110 for the detachable coaxial sensor device 100.

Referring to FIG. 9, the electronics housed inside the cavity 300 of the detachable coaxial sensor device 100 contains microcontrollers (or MCU) 120 to process the load information obtained from sensors or sensor suite 130. The MCU 120 is in communication with non-volatile memory 122 for storing data, predetermined thresholds for various measurement data from the sensors in the sensor suite 130, and/or executable codes therefor; communication module(s) 150, including, but not limited to, wireless mesh 152, Bluetooth 154, and/or ultra-wide band transceiver 156. The detachable coaxial sensor device 100 further include a positing module 160, including, but not limited to, ultra-wideband (or UWB) positioning device 162.

The sensor suite 130 includes, but not limited to, one or more strain/force sensors 132, one or more vibration sensors 134, one or more inclination sensor 136, one or more humidity sensor 142, one or more barometric sensors 140, and one or more temperature sensor 138, is mounted on the sensor placement mounting 108. One or more sensors of the sensor suite 130, such as inclination sensors 136, may be installed inside the cavity 300 of the detachable coaxial sensor device 100. Batteries and power management devices (not shown) are placed inside the cavity 300 of the detachable coaxial sensor device 100 to supply power for the detachable coaxial sensor device 100 to enable it to work wirelessly. Data collected by the detachable coaxial sensor device 100 is transmitted to the wireless communication device 700 by low power wireless communication electronics housed in the cavity 300. The wireless communication device 700 takes the low power wireless signal from the detachable coaxial sensor device 100 and re-transmits, utilizing wireless communication 804 for sending data, to computing devices 806. From the computing devices 806, the data can then be analyzed. Should the data indicate potential danger, alerts and notifications can be sent to the user in graphical or a tabular format 808.

Figure 11:
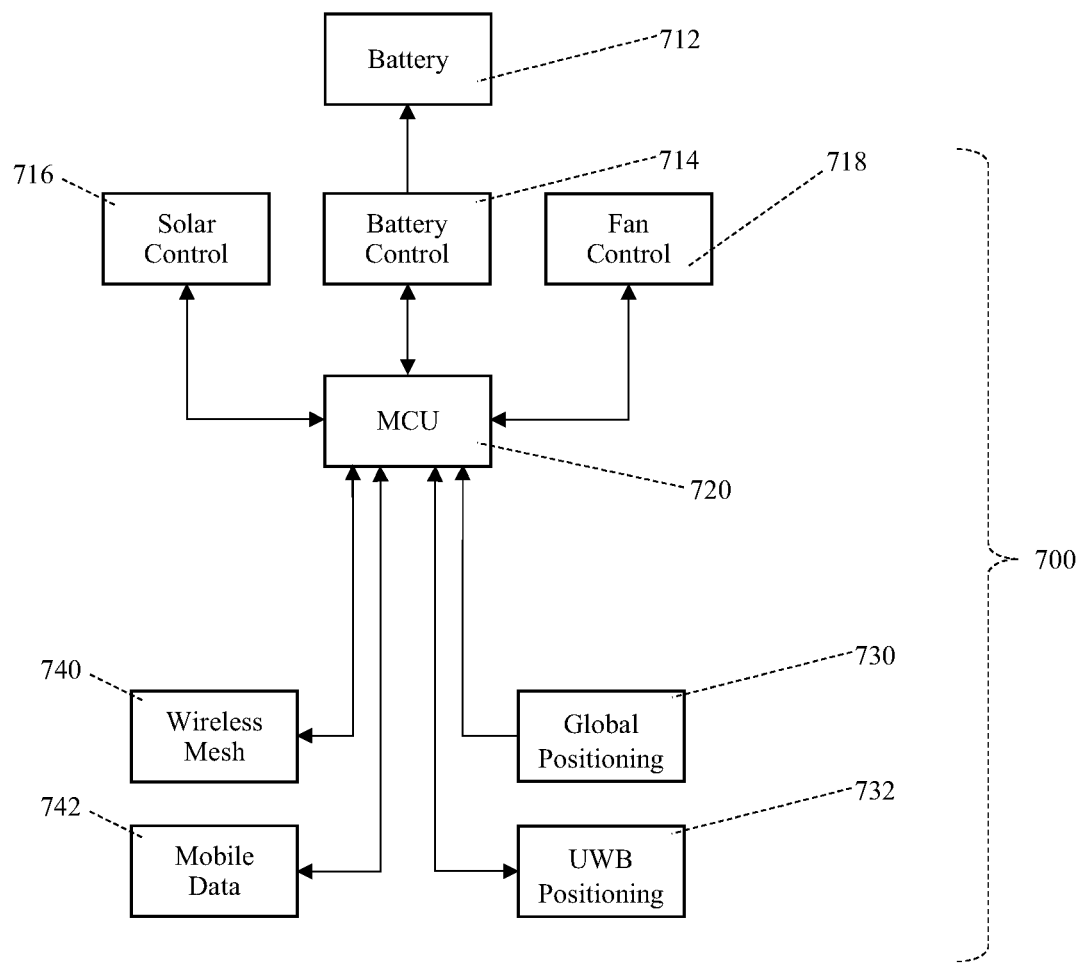
FIG. 11 shows a functional block diagram 710 of the wireless communication device 700.

FIG. 11 shows a functional block diagram of the wireless communication device 700. The wireless communication device 700 includes an MCU 720. The MCU 720 is in communication with a battery control 714 for controlling the battery 712, a solar control 716, and a fan control 718. The MCU 720 is further in communication with wireless mesh 740 and/or mobile data 742 for wireless data communication, with global positioning device 730 and/or ultra-wideband (UWB) positioning device 732 for detecting the position of the wireless communication device 700.

Referring back to FIG. 5b, the detachable coaxial sensor device 100 is inserted or attached coaxially to the lower tubular section 512 and resting on top of the jack screw nut 504. The upper tubular section 510 is coaxial to the lower tubular section 512 and is held to a fixed height by the locking pin 508 that sits on top of the top plate 102 of the detachable coaxial sensor device 100. The load carried by the upper tubular section 510 is transferred to the detachable coaxial sensor device 100 via the locking pin 508. The detachable coaxial sensor device 100 then transfers the load to the lower tubular section 512 via the jack screw nut 504.

In this embodiment, the loading information with the inclination direction/angle of the telescopic temporary support prop 500 can be captured by the detachable coaxial sensor device 100.

Figure 8:
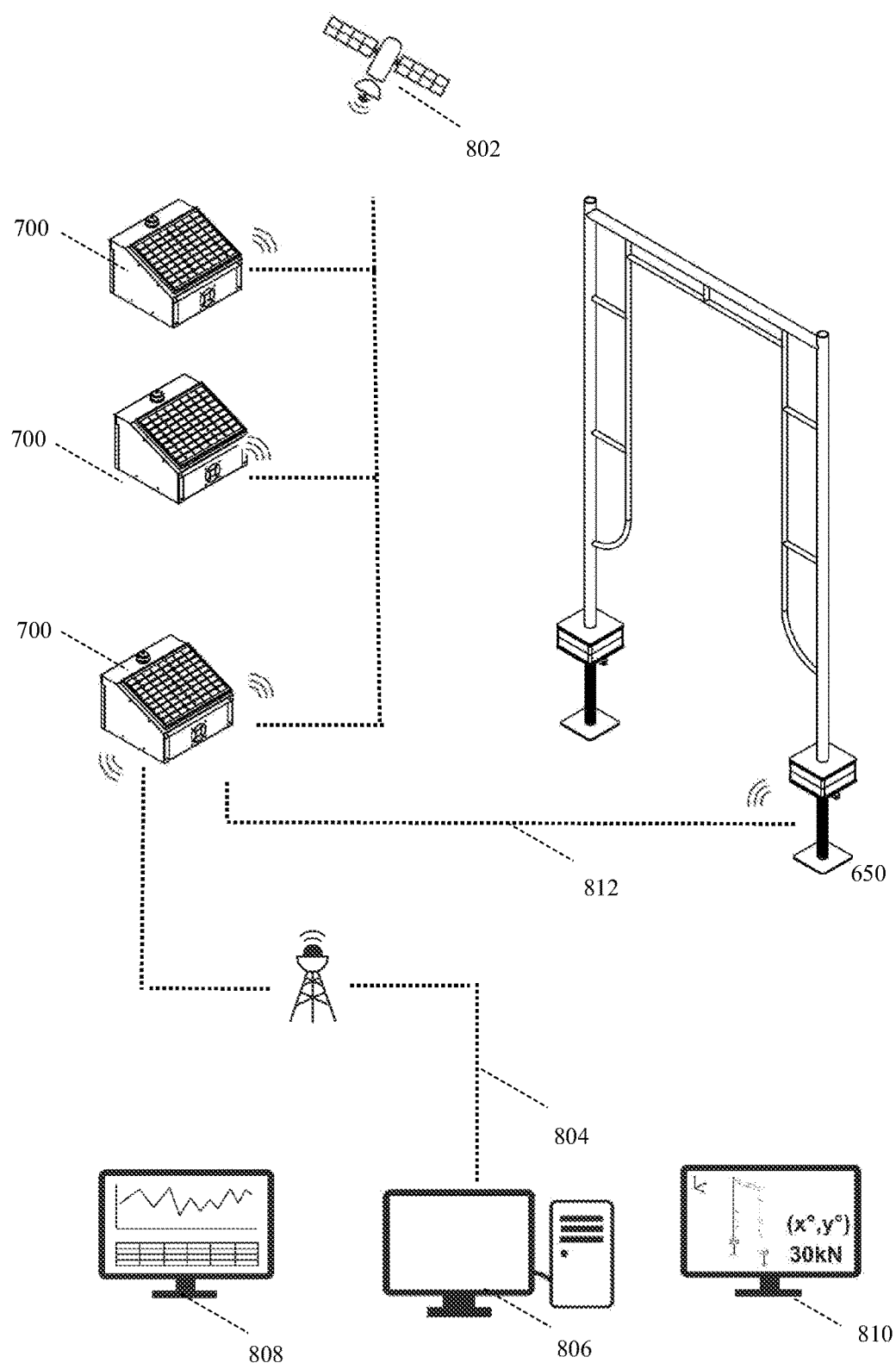
FIG. 8 shows a schematic block diagram showing wireless communication devices 700 receiving signals from a global satellite navigation positioning satellite network 802, communication link 812 from wireless communication devices 700 to detachable coaxial sensor device 100 on the temporary support frame system assembly 650, communication link 804 from wireless communication devices 700 to computer device 806, graphical and/or tabular formats of presentation 808 and digital building information models 810.

FIG. 8 shows a block diagram of a monitoring system, including a plurality of wireless communication devices 700, each of which is in communication with the global satellite navigation positioning satellite network 802 through the global positioning device 730, obtains precise position information data for the wireless communication device 700. The wireless communication devices 700, in wireless connection with the detachable coaxial sensor device 100, can establish the three-dimensional position of the detachable coaxial sensor device 100 with respect to the positions of the wireless communication devices 700 using electronic positioning means, such as UWB positioning device 162 on the detachable coaxial sensor device 100 and UWB positioning device 732 on the wireless communication device 700. The position information can then be transmitted wirelessly from the detachable coaxial sensor device 100 to the wireless communication device 700 to determine the relative and precise position of the detachable coaxial sensor device 100 relative to the wireless communication device 700, thence via wireless communication 804 to computing devices 806 for further processing of the position, load and inclination data. The processed information can then be presented to the user in a graphical or a tabular format 808. The processed information can also be incorporated into digital building information models 810 for visualization of the temporary support structures.

It is to be noted that Global Positioning 730 may include Global Navigation Satellite System (or GNSS positioning), and this provides reference position points for all detachable coaxial sensor devices 100 via UWB Positioning 732. Another use of the wireless communication devices 700 is time referencing for accurate timing within the networked system.

Figure 10:
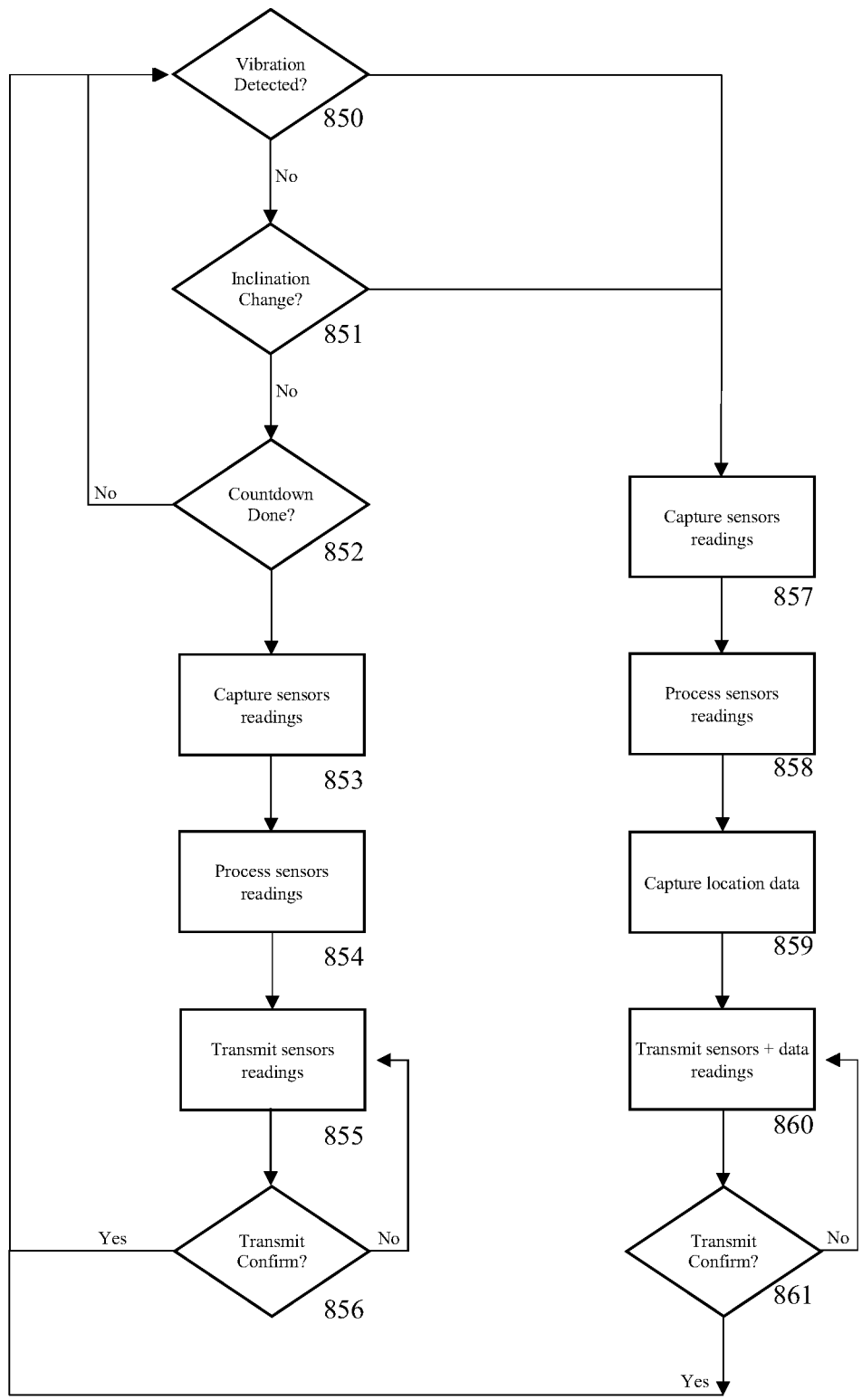
FIG. 10 shows a process flow diagram of the MCU 120 of the detachable coaxial sensor device 100.

FIG. 10 shows a process flow diagram of the MCU 120 of the detachable coaxial sensor device 100. At the step 850, MCU 120 monitors any vibration through vibration sensor 134, and if the vibration is present, then MCU carries out the steps starts from step 857; if not, at step 851, MCU 120 checks the inclination direction/angle through the inclination sensor 136. If there is inclination that is more than a predetermined threshold, MCU 120 carries out the steps starts from step 857; if not, at step 852, MCU 120 checks a countdown clock (not shown). If the countdown clock is not done, then MCU repeats steps 850 and 851; otherwise, MCU carries out the steps starts from step 853. At step 853, MCU 120 obtains data from the sensors in the sensor suite 130, including, but not limited to stain/force sensor 132, vibration sensor 134, inclination sensor 136, humidity sensor 142, barometric sensor 140, and temperature sensor 138. The, at step 854, MCU 120 processes the sensor readings obtain at the step 854. For example, one or more environmental sensor readings, such as measured temperature, measured humidity readings, and measured barometric readings, may be used in compensating measured strain/force readings, measured vibration readings, and/or measured inclination readings for varying conditions with respect to the operating environment. For example, expansion/contraction in a certain structural material, such as metal, with a high temperature may result in a certain error(s) in reading, for example, strain/force from the strain/force sensor 132. In addition, certain sensors themselves may be sensitive or readings therefrom may be affected by (or error is introduced by) temperature or other environmental factor(s). Accordingly, such measured value(s) can be compensated if the temperature readings of the environment, for example, is collected. The processor (MCU) 120 may take measured temperature readings (and/or other environmental sensor readings), and compensate the other sensor readings to nullify temperature effect on metal, structural material(s) that the sensor(s) is measuring or sensors themselves. During the step 854, sensor readings maybe of non-human understandable units. The MCU converts the data into format readily human understandable of the monitored sensor. In addition, compensation calculations may be performed in 804 to provide data that may be affected by environmental variable such as temperature. At step 855, the MCU 120 transmits the sensor readings and processed data to the wireless communication device 700 via communication modules 150, which includes, but not limited to, wireless mesh 152, Bluetooth 154, and ultra-wide band device 156. Once the wireless communication device 700 receives the sensor readings and processed data by the detachable sensor device 100, the wireless communication device 700 transmits a receive confirmation. At step 856, MCU 120 wait for this receive confirmation from the wireless communication device 700. If MCU 120 does not receive the confirmation, MCU 120 carries onto step 855 to retransmit the data; otherwise, MCU 120 carries out the steps starts from step 850.

At step 857, after MCU 120 detects vibration at step 850 or inclination at step 851, MCU 120 captures data from sensors in the sensor suite 130. Then, at step 858, MCU 120 process data from the sensors in the sensor suite 130. At step 859, MCU 120 further obtain position data from the positioning module 160, such as UWB positioning device 162. Then, MCU 120 transmits the sensor readings and processed data with position data to the wireless communication device 700. Once the wireless communication device 700 receives the sensor readings and processed data with position data from the detachable coaxial sensor device 100, the wireless communication device 700 transmits a receive confirmation. At step 861, MCU 120 wait for this receive confirmation from the wireless communication device 700. If MCU 120 does not receive the confirmation, MCU 120 carries onto step 860 to retransmit the data; otherwise, MCU 120 carries out the steps starts from step 850.

Figure 12:
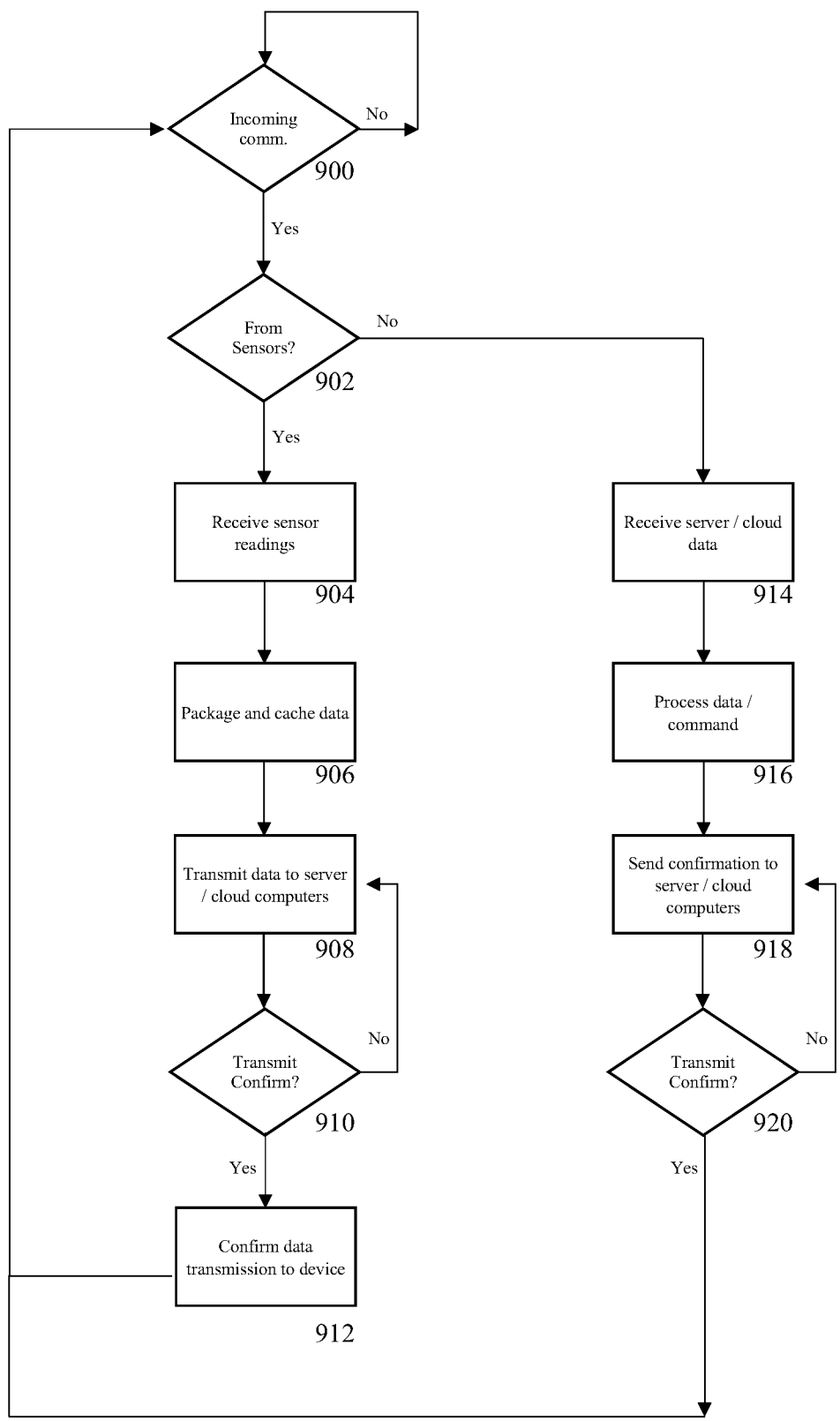
FIG. 12 shows a process flow diagram of the wireless communication device 700 for communication between sensor device 100 and communication to computing device 806.

FIG. 12 shows a process flow diagram of the wireless communication device 700 for communication between sensor device 100 and communication to computing device 806. At the step 900, the wireless communication device 700 waits for incoming communication. At step 902, the wireless communication device 700 determines whether the communication is from detachable sensor device 100 or from cloud or computing device 806. If the communication is from the sensor, the message is decoded 904. Once the message is decoded, the sensor information is cached into memory 906 and prepared to be sent to the computer servers 806. The data are sent to computer servers 806 periodically at step 908. The system waits for confirmation from the computer servers 806 at 910 and if the confirmation does not arrive within a pre-set amount of time, the data is resent 908. Should the confirmation arrive from computer servers 806 within the pre-set amount of time, the communication device 700 sends confirmation 912 to the sensor device 100 and system waits for the next communication 900. At step 902, the wireless communication device 700 determines the communication is from computing device 806, the communication device process the information and command in step 916. After processing the command and information and performing the requisite command, confirmation is sent back to the computer server 806 in step 918. The communication device 700 waits for the confirmation from the computer server 806 and once the confirmation is received, the system waits for the next communication 900. Should the confirmation be not received within a pre-set amount of time, the confirmation is sent again to the server 918.

The invention claimed is:

1. A sensor device for monitoring a condition of a temporary support device having a first tubular member, a second tubular member that telescopically engages with the first tubular member, a locking pin, and a jack screw nut, the sensor device comprising:
   i. a tubular member having a first opening and a second opening, the tubular member slidably engages with the temporary support device through the first and second openings, wherein the first opening interfaces with the first tubular member for receiving a load from the first tubular member through the locking pin, and the second opening interfaces with the second tubular member for receiving a load from the second tubular member through the jack screw nut whereby a total load on the temporary support device is on the tubular member;
   ii. a sensor suite attached on the tubular member, the sensor suite comprising a strain sensor that monitors and senses a strain force on the temporary support device, and an inclination sensor that monitors and senses inclination direction/angle of the temporary support device;
   iii. a memory for storing one or more predetermined thresholds;
   iv. a controller that is in communication with the sensor suite and the memory for comparing data from the sensor suite with the one or more predetermined thresholds in the memory for monitoring conditions on the temporary support device.

2. The sensor device as recited in claim 1 herein the tubular member comprising;
   a. a first plate member that extends from the first opening for receiving the load from the first tubular member of the temporary support device; and,
   b. a second plate member that extends from the second opening for receiving a load from the second tubular member of the temporary support device.

3. The sensor device as recited in claim 1, wherein the temporary support device is a temporary support prop, a temporary support framing system, or a temporary support scaffold.

4. The sensor device as recited in claim 1 further comprising a position recognition sensor that receives position information of the temporary support device and is in communication with the controller.

5. The sensor device as recited in claim 1 further comprise a housing enclosure to form a housing for enclosing the sensor suite between the first plate and the second plate.

6. The sensor device as recited in claim 5, wherein the housing further encloses the controller.

7. The sensor device as recited in claim 2 further comprising a communication module that is in communication with the controller.

8. The sensor device as recited in claim 7, wherein the communication module comprises a wireless communication module.

9. The sensor device as recited in claim 8, wherein the sensor suite further comprising one or more of vibration sensor, humidity sensor, barometric sensor, and temperature sensor.

10. A sensor system, comprising:
   i. one or more sensor devices as recited in claim 9; and
   ii. a wireless device comprising:
      a. a controller,
      b. a communication module in communication with the controller for communicating with the communication module of each of the one or more sensor devices;
      c. a global positioning device in communication with the controller for detecting position information data for the one or more wireless devices;
   wherein the controller receives the position information from the one or more sensor devices to determine the position of the one or more sensor devices relative to the wireless device.

11. A monitoring system, comprising:
   i. one or more sensor systems as recited in claim 10; and
   ii. a server;
      wherein each of the one or more sensor systems further comprises a second communicating module for communicating with the server.

* * * * *